UNITED STATES PATENT OFFICE.

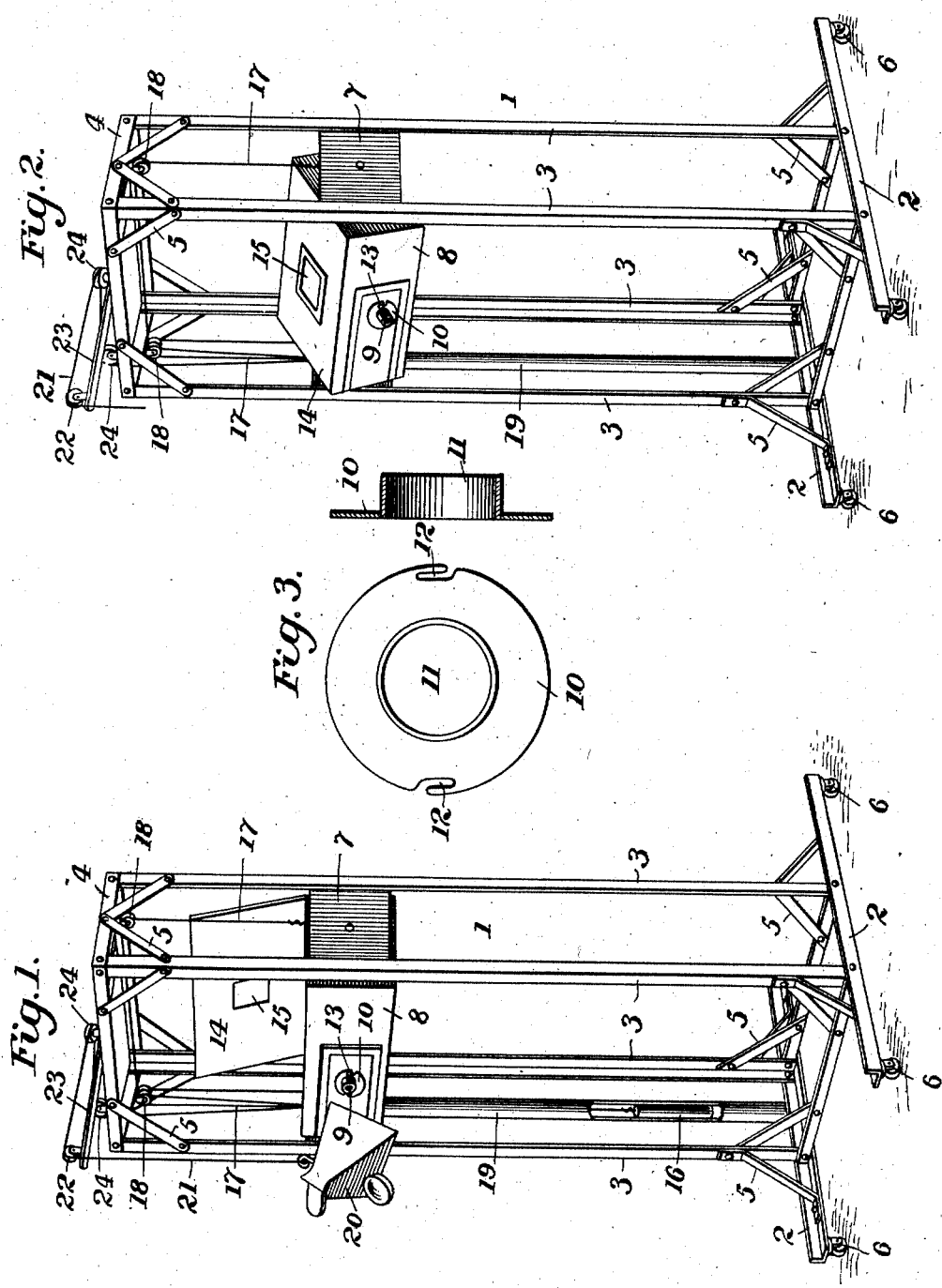

HARRY F. WAITE, OF NEW YORK, N. Y.

X-RAY APPARATUS.

967,469.  Specification of Letters Patent.  Patented Aug. 16, 1910.

Application filed July 5, 1906. Serial No. 324,810.

*To all whom it may concern:*

Be it known that I, HARRY F. WAITE, a citizen of the United States, and resident of New York, county of New York, State of New York, have invented certain new and useful Improvements in X-Ray Apparatus, of which the following is a specification.

This invention relates to X-ray apparatus and has for an object to provide an apparatus whereby the rays can be more easily directed to a specific object and whereby surrounding objects and the operator can be protected from the rays' injurious effects; and the invention consists in an apparatus embodying various features of construction and arrangement of parts having the general mode of operation substantially as hereinafter more particularly pointed out.

Referring to the drawings, Figure 1 is a perspective view of an apparatus embodying my invention; Fig. 2 is a similar view with the parts in slightly different positions; and Fig. 3 shows an elevation and cross-section of one of a series of shields used with the apparatus.

1 indicates a frame constructed preferably of base bars 2, uprights 3, and top bars 4, all of which may be suitably braced as by rods 5. The width of the frame is such that an operating table may be placed between the uprights 3, and the frame is mounted upon casters 6 for convenience in moving it about. The uprights 3 are preferably formed of angle iron for the purpose of giving strength to the structure and also to form guide-ways for the vertically sliding members 7 arranged between them as shown in the drawings. Pivotally mounted on and arranged between the sliding members is the housing 8 for the X-ray tube. The tube itself is not shown, but it will be understood that it is adapted to be arranged within this housing 8 and suitably connected with the source of electricity. The housing 8 is box-shaped and is lined with lead or other ray-proof substance and is provided in one of its sides with an aperture 9 which may be more or less contracted by the use of any one of a number of shields 10 having different size perforations 11. One of the shields, as preferably constructed, is illustrated in Fig. 3 and may be attached to the box by means of bayonet joints 12 fitting over suitable projections 13 arranged adjacent the aperture 9. The purpose of more or less contracting the aperture is to allow of the direction of the rays to a more or less contracted area as may be desired by the operator. The top of the box is closed by a lead lined cover 14 hinged thereto, and arranged at a convenient place in the cover or in some other part of the housing is a window 15 formed of lead glass, for the purpose of observation. Each of the sliding members 7 is connected to a weight 16 by cords 17 passing over suitable pulleys 18 at the top of the frame. The weight 16 corresponds approximately to the weight of the sliding members, the housing and the fluoroscope (hereinafter mentioned), and is preferably guided in a tube 19 mounted in the frame.

The fluoroscope 20 is suspended by a cord 21 passing over a pulley 22 on an arm 23 projecting from one of the top bars 4 of the frame, said cord further extending over other pulleys 24 and having connection with the weight 16. This cord 21 is of proper length to hold the fluoroscope in line with the aperture 9 in the housing. The essential feature of this part of the invention is that the fluoroscope is counter-weighted and its cord may be connected with the weight 16 or it may be provided with a separate weight, whereby the housing and the fluoroscope may be moved independently of each other.

It will be seen from the drawings and the above description, that the housing 8 containing the X-ray tube may be easily raised or lowered and will remain at any desired elevation by reason of its perfect counterbalance; also that the fluoroscope when attached to the same counter weight will follow the vertical movements of the housing and always remain in operative position opposite the aperture 9. Further it will be seen that by the construction and arrangement above set forth the housing 8 may be tilted to any desired angle and the rays issuing from the aperture 9 may be directed to the exact area required by the operator, the surrounding parts and the operator himself being meanwhile fully protected from any injurious effects which might be caused by the rays, and the clearness of an X-ray photographic plate being insured by thus eliminating otherwise interfering secondary rays.

It is obvious that many changes in the details of construction and arrangement of parts may be made without departing from the spirit of the invention, and the forms indicated in the drawings are merely typical to explain the nature of the invention.

Having described my invention what I claim is,—

1. In an X-ray apparatus, a supporting frame comprising pairs of spaced side members, a slide in sliding engagement with each pair of spaced side members, an X-ray tube housing mounted on horizontal pivots in the slides, a tube connected with the supporting frame, and a counterbalance weight in the tube connected to the slides.

2. The combination with an X-ray tube housing having an exposure aperture, a shield for said aperture comprising a flanged tube, the flange being provided with open circumferential slots, and pins on the housing engaging the slots.

In testimony whereof I affix my signature in presence of two witnesses.

HARRY F. WAITE.

Witnesses:
CHARLES KALLMEYER,
MAX C. GAVEIS.